United States Patent [19]

Falk

[11] Patent Number: 4,461,351

[45] Date of Patent: Jul. 24, 1984

[54] PROCESS FOR PARTIALLY OR COMPLETELY PLUGGING PERMEABLE ZONES IN A SUBTERRANEAN FORMATION

[75] Inventor: David O. Falk, Denver, Colo.

[73] Assignee: Marathon Oil Company, Findlay, Ohio

[21] Appl. No.: 470,752

[22] Filed: Feb. 28, 1983

[51] Int. Cl.³ ............................................. E21B 33/138
[52] U.S. Cl. .................................... 166/295; 166/300; 523/130; 524/512
[58] Field of Search ............... 166/270, 294, 295, 300; 405/264; 523/130; 524/512

[56] References Cited

U.S. PATENT DOCUMENTS

| | | |
|---|---|---|
| 1,985,993 | 1/1935 | Herrmann ............................ 524/512 |
| 2,787,603 | 4/1957 | Sanders ............................ 524/512 X |
| 3,495,412 | 2/1970 | Sakata et al. ........................ 405/264 |
| 3,743,612 | 7/1973 | Vial ................................ 524/512 X |
| 3,758,641 | 9/1973 | Zweigle ............................ 524/512 X |
| 3,795,276 | 3/1974 | Eilers et al. ........................ 166/295 |
| 3,957,904 | 5/1976 | Isaoka et al. ...................... 524/512 X |
| 4,022,741 | 5/1977 | Tuka et al. ........................ 524/512 X |
| 4,098,337 | 7/1978 | Argabright et al. ................... 166/270 |
| 4,155,405 | 5/1979 | Vio ................................... 166/295 |
| 4,290,485 | 9/1981 | Free .................................. 166/295 |
| 4,338,379 | 7/1982 | Strolle et al. ...................... 524/512 X |

*Primary Examiner*—George A. Suchfield
*Attorney, Agent, or Firm*—Jack L. Hummel; Rodney F. Brown

[57] ABSTRACT

Highly permeable zones in a subterranean formation are selectively plugged by injecting an aqueous solution of urea, an aldehyde and an acrylamide polymer via a well into the highly permeable zones. The solution forms a polymer resin in situ at a temperature of from about 20° C. to 75° C. and a pH of from about 3 to 9 and over a period of from about 2 to 72 hours. The resulting polymer resin either partially or completely plugs the highly permeable zones in the formation.

23 Claims, No Drawings

PROCESS FOR PARTIALLY OR COMPLETELY PLUGGING PERMEABLE ZONES IN A SUBTERRANEAN FORMATION

DESCRIPTION

1. Technical Field

The invention relates to a process for selectively plugging highly permeable zones in a subterranean formation with a polymer resin.

2. Background Art

Fluids preferentially migrate into highly permeable zones in subterranean formations. This migration is undesirable when injecting treatment fluids into hydrocarbon-bearing formations for post-primary recovery of residual hydrocarbons. The treatment fluids channel through the highly permeable zones bypassing the less permeable zones. The result is poor conformance and flow profiles of the treatment fluid in the formation. The hydrocarbons residing in the less permeable zones are not produced and the overall yield of hydrocarbons from the formation is reduced.

Highly permeable zones in subterranean formations are plugged to prevent migration of treatment fluids into them and to divert treatment fluids into adjacent less permeable zones. One plugging method is to inject fluids into the formation prior to treatment fluids. The injected plugging fluids preferentially enter and plug the highly permeable zones of the formation. Subsequently injected treatment fluids are diverted into less permeable zones facilitating recovery of the hydrocarbons therein.

It can be desirable to prevent migration of fluids in subterranean porous media other than hydrocarbon-bearing formations, such as soils. Plugging fluids are injected into soil as soil stabilizers to reduce soil permeability. Soil stabilizers seal subterranean building structures to prevent migration of water into the structure. Soil stabilizers also prevent seepage of water through permeable water retainers such as irrigation ditches and earthen dams.

U.S. Pat. No. 3,495,412 to Sakata et al teaches a process for stabilizing a water-permeable soil. A three-component aqueous solution comprising urea, formaldehyde and polyvinyl alcohol is injected into a water-permeable soil where it is cured with an acidic substance.

Polymer gels are used specifically for hydrocarbon recovery processes. U.S. Pat. No. 4,098,337 to Argabright et al teaches the sequential injection of aqueous polyacrylamide and formaldehyde into a hydrocarbon-bearing formation. The polyacrylamide reacts in situ with the formaldehyde to form a gel.

The polyacrylamide gels have limited utility for plugging highly permeable zones. The gels form only temporary plugs, because they are water soluble. The gels are also disadvantageous, because the gels are thermally unstable and in situ gelation is difficult to control. The prior art processes utilizing urea-formaldehyde compositions are similarly inadequate in hydrocarbon-bearing formations, because they are too sensitive to extreme formation conditions.

A need exists for a process to prevent migration of fluids into highly permeable zones of a subterranean formation. A need exists for such a process, which can be practiced under the elevated thermal conditions encountered in a hydrocarbon-bearing formation. A process is needed whereby an injected fluid reacts in situ under formation conditions to produce a high viscosity material, which either partially or completely plugs the highly permeable zones.

DISCLOSURE OF THE INVENTION

The present invention provides a process for selectively plugging highly permeable zones in a subterranean formation with a polymer resin. Urea, an aldehyde, and an acrylamide polymer are injected via a well into a hydrocarbon-bearing formation. The resin components preferentially migrate into the highly permeable zones of the formation where they react upon contact to produce a polymer resin. The resin partially or completely plugs the highly permeable zones.

The rate and degree of completion of resin formation are a function of the process parameters. Sequential injection of the less viscous urea ahead of the aldehyde and polymer achieves deep penetration of the highly permeable zones and more complete plugging. Reducing pH or increasing the reaction temperature within ranges given herein induces complete resin formation at a rapid rate. Conversely, raising the pH, decreasing the concentration of urea and/or aldehyde, or increasing the polymer concentration results in partial resin formation.

Partial plugging may have particular advantages. A partial plug maintains some available porosity in the formation, if it is later necessary to go back and produce the plugged zones. Partial plugging allows multiple-stage plugging treatment of the formation. A partial plug is less expensive from a material cost standpoint, because it requires smaller quantities of chemical reactants.

BEST MODE FOR CARRYING OUT THE INVENTION

The present invention provides a process for selectively plugging highly permeable zones in a subterranean formation with a polymer resin. Urea, an aldehyde, and an acrylamide polymer are injected into a hydrocarbon-bearing formation via a well in fluid communication with the formation. The urea, aldehyde and acrylamide polymer preferentially enter the highly permeable zones where they react in situ to form a polymer resin, which partially or completely plugs the highly permeable zones.

A polymer resin is an amorphous, water insoluble solid. The resin components are linked by chemical bonds in a dense, but random network to form a single large molecular mass. A polymer is a necessary building block of the polymer resin.

The polymer building block of the polymer resin is a water-soluble acrylamide polymer. The acrylamide polymer is either a polyacrylamide homopolymer or copolymer containing acrylamide. Up to about 40% of the amide groups of the polyacrylamide homopolymer can be hydrolyzed, i.e. up to 40% of the amide groups can be converted to carboxyl groups, leaving the remaining 100% to about 60% of the amide groups unhydrolyzed. The copolymer is comprised of acrylamide and a second suitable monomer. Examples of the suitable monomer include styrene, acrylonitrile, methylacrylate, methyl methylacrylate, vinyl acetate, sodium acrylate and the like. The copolymer contains from about 99.99% to about 60% by weight unhydrolyzed acrylamide groups and from about 0.01% to about 40% by weight of the second monomer, which is preferably sodium acrylate. The unhydrolyzed polyacrylamide homopolymer containing 100% unhydrolyzed acrylamide groups is the most preferred acrylamide polymer. The acrylamide polymer has a molecular weight of from about 100,000 to about 10,000,000 and preferably about 1,000,000 to about 6,000,000.

Preparation of the acrylamide polymer is known to one of ordinary skill in the art. Polyacrylamides can be prepared by polymerizing an aqueous solution of acrylamide with known catalyst systems. The resulting polyacrylamide is thereafter diluted with water. U.S. Pat. No. 4,034,809 to Phillips et al teaches a method for partial hydrolysis of polyacrylamide.

The aldehyde is either a monoaldehyde or a dialdehyde. The aldehyde preferably contains from one to about four carbon atoms. Exemplary monoaldehydes are formaldehyde and acetaldehyde. Glyoxal is an exemplary dialdehyde. Formaldehyde is the most preferred aldehyde.

According to one embodiment, the reactants are injected sequentially into the highly permeable zones. A relatively low viscosity urea solution is injected ahead of an aqueous aldehyde/acrylamide polymer slug. Once the urea is in place, the relatively high viscosity aldehyde/polymer slug is injected. It preferentially fingers into the highly permeable zones where it contacts the urea. Alternatively all the reactants are injected simultaneously by mixing the reactants either immediately prior to or during injection.

It is preferred that the initial concentrations in the reaction solution are such that the equivalents of aldehyde groups exceeds the moles of urea. The preferred ratio of equivalents of aldehyde groups to moles of urea initially present in the reaction solution is from about 1.2:1 to about 2:1 and most preferably the ratio is about 1.5:1. It is preferred that the moles of urea initially present in the reaction solution exceed the equivalents of unhydrolyzed acrylamide groups. The preferred ratio of equivalents of moles of urea to equivalents of unhydrolyzed acrylamide groups is from about 28:1 to about 288:1 and most preferably the ratio is about 115:1.

Where urea, formaldehyde and unhydrolyzed polyacrylamide are the reactants, the relative weight concentrations of the reactants initially present in the reaction solution are as follows. The concentration of urea is from about 4% to about 50% and it is preferably about 20%. The concentration of formaldehyde is from about 4% to about 40% and it is preferably about 15%. The concentration of polyacrylamide is from about 0.1% to about 1.0% and it is preferably about 0.2%.

The resin formation reaction requires a temperature of from about ambient atmospheric, about 20° C., to about 75° C. and preferably about 40° C. to about 60° C. The reaction requires a pH of from about 3 to about 9 and preferably about 4 to about 8. Generally the formation water is slightly alkaline due to carbonate rock naturally present. It may be necessary to inject a pH adjustor with the reactants or to pre-flush the formation water with a pH adjustor. Pre-flushing requires a substantial quantity of pH adjustor to alter the pH of formation water, because of the formation's high buffering capacity. Therefore, a pH adjustor is preferably mixed with the reactants. The pH adjustor is either simultaneously mixed or premixed with the reactants in an amount such that the pH of the reaction solution is within the range stated above for resin formation. The pH of the urea-aldehyde-polymer solution is initially about 4 without any pH adjustment. The pH of the reaction solution can be adjusted upward by addition of a base such as sodium hydroxide or sodium phosphate or adjusted downward by the addition of an acid such as hydrochloric acid. Additional pH adjustments can be made to influence the reaction rate once the reactants are in place by the injection of an acid or a base into the highly permeable zones.

About 50 to about 200 barrels of the reactants are injected into the highly permeable zones at a rate of from about 100 to about 400 barrels per day via a well. Where the reactants are premixed at the surface, the reactants are injected immediately upon mixing. The preference of the reactants to enter the selected zones may be further ensured by the use of packers.

The reaction begins once all the reactants are in contact. Reaction time is the interval from the time of contacting until formation of the resin product. Reaction time is a function of the reaction temperature, pH and concentration of the reactants. The reaction time is determined by fixing the parameters above within their respective range of values given herein such that the reaction time is from about 2 to about 72 hours and preferably about 8 to about 48 hours. An extended reaction time is necessary to enable the reactants to deeply penetrate the highly permeable zones prior to resin formation.

Upon completion of the reaction, a resin plug is in place in the highly permeable zones. If a packer has been used, it is removed from the well bore. Post-primary treatment fluids such as water, polymer, micellar/polymer, etc. are injected into the formation to enhance recovery of hydrocarbons therefrom. The plug partially or completely prevents the migration of the post-primary treatment fluids into the highly permeable zones.

The mechanism for polymer resin formation is believed to be several reactions among the urea, aldehyde and polymer. The methylolation of urea or acrylamide polymer initiates resin formation. Aldehyde methylolates both urea and acrylamide polymer to provide the primary resin intermediates. Mono-dimethylolurea is the resin intermediate produced by the reaction between urea and formaldehyde. The methylolation of urea by formaldehyde and the subsequent condensation of mono-dimethylurea is described in the prior art. See Lang, *Organic Chemistry of Synthetic High Polymers*, Interscience Wiley, New York, N.Y., 1967, at pages 142–145. Aldehyde reacts with the unhydrolyzed amide group of the acrylamide polymer to produce a methylolated acrylamide polymer intermediate.

The urea and acrylamide intermediates undergo multiple condensation reactions to form the network resin. Mono-dimethylolurea reacts either with other mono-dimethylolurea or methylolated acrylamide polymer. Methylolated acrylamide polymer primarily reacts with mono-dimethylolurea. Methylolated acrylamide polymers do not react directly with each other, because of steric hindrance.

The rate of resin formation and the properties of the resulting resin product are largely dependent on the concentration and type of acrylamide polymer used in the process. The presence of acrylamide polymer in the urea-aldehyde-polymer reaction system decreases the rate of resin formation. The formation rate of a urea-formaldehyde resin without polymer under the same reaction conditions is significantly faster. The rate diminishing effect of the polymer is believed to be attributable to competition between the acrylamide polymer and urea for the aldehyde methylolating agent and to steric factors. The acrylamide polymer is more difficult to link into the resin network, because of its relative bulk which shields reaction sites.

The presence of acrylamide polymer in the reaction system enables one to create partial resins. As a rule the greater the number of reaction sites present on the starting materials and intermediates, the higher the degree of network bonding in the resin. A high degree of network bonding creates the characteristic rigid, amorphous structure of a polymer resin. However, the steric factors noted above limits total bonding in the acrylamide polymer resin network thereby inhibiting complete resin formation. The presence of unutilized reaction sites dilutes the density of network bonding in the resin. A resin with a relatively lower degree of network bonding is incomplete, i.e. the resin is a high viscosity fluid containing some solids and a substantial amount of water.

Use of partially hydrolyzed polyacrylamide, rather than the unhydrolyzed polyacrylamide homopolymer, further inhibits resin formation. Partially hydrolyzed polyacrylamide has fewer reaction sites than the unhydrolyzed polyacrylamide, because of its lower concentration of reactive amide groups. Therefore, partially hydrolyzed polyacrylamide produces an incomplete resin.

The practitioner of the present invention can fix the resin reaction time and the completeness of the resin product by controlling the reaction parameters of temperature and pH in conjunction with the concentrations of the reactants. High temperature and low pH favor complete resin formation, while low temperature and high pH result in incomplete resin formation. Increasing the concentration of urea and aldehyde in the reaction mixture enhances resin formation.

It may be desirable to inhibit resin formation where it is necessary to inject the reactants into the formation at a relatively low rate due to the particular formation characteristics. Decreasing the reaction rate enables the reactants to deeply penetrate the formation prior to resin formation. Premature resin formation decreases the ability of the resin to fully penetrate and plug the formation.

The following examples are illustrative of the present invention and are not to be construed as limiting the scope thereof. All concentrations are given on a percent by weight basis unless otherwise noted.

EXAMPLE 1

24 ml of reagent grade 37% concentrated formaldehyde solution is added to 25 ml of 0.5% aqueous unhydrolyzed polyacrylamide. The molecular weight of the polyacrylamide is about 5,000,000. 12 g of reagent grade, solid urea is dissolved in the formaldehyde-polyacrylamide solution. The relative concentration of reactants in the reaction solution is about 0.2% polyacrylamide, 15% formaldehyde and 20% urea. The initial pH of the reaction solution is 4.25. The reaction solution is maintained at a temperature of about 50° C. in a water bath. After 35 minutes the reaction solution becomes very cloudy. After 1.5 hours the product is a loose solid. After 24 hours the product sets to a sticky solid.

EXAMPLE 2

The urea-formaldehyde-polyacrylamide reaction solution of Example 1 has an initial pH of 4.3. After 1.5 hours the reaction solution is clear. After 5.5 hours the reaction solution becomes very cloudy following exposure to direct sunlight. After 12.5 hours the product is very thick, yet still flowing and has a pH of 3.3.

EXAMPLE 3

The urea-formaldehyde-polyacrylamide reaction solution of Example 1 has a pH of 4.3 after the addition of hydrochloric acid. The reaction solution is maintained at a temperature of about 50° C in a water bath. After 24 hours the product is a loose solid and has a pH of 3.0. After 47 hours the product is a non-flowing solid resin.

EXAMPLE 4

The urea-formaldehyde-polyacrylamide reaction solution of Example 1 has an adjusted pH of 8.6 with the addition of sodium hydroxide. The reaction solution is maintained at a temperature of about 50° C. in a water bath. After 24 hours the reaction solution is very cloudy and has a pH of 5.5. After 47 hours the reaction solution volume is about one-half solid precipitate and has a pH of 5.7.

EXAMPLE 5

24 ml of 37% formaldehyde is diluted with 26 ml of water. 12 g of reagent grade, solid urea is dissolved in the formaldehyde solution resulting in relative concentrations of 15% formaldehyde and 20% urea. The initial pH of the reaction solution is 4.0. The reaction solution is maintained at a temperature of about 50° C. in a water bath. After 1.5 hours the product is a paste-like solid.

EXAMPLE 6

48 ml of 37% formaldehyde is diluted with 2 ml of water. 24 g of reagent grade, solid urea is dissolved in the formaldehyde solution resulting in relative concentrations of 30% formaldehyde and 40% urea. The initial pH of the reaction solution is 4.25. The reaction solution is maintained at a temperature of about 50° C. After 1.5 hours the product is a rigid solid.

Examples 1–6 are summarized in the following Table:

TABLE

| Example | concentration of reactants (wt %) | | | moles of reactants | | | pH adjustor | initial pH of reaction | initial reaction temperature (°C.) | total reaction time | product description |
|---|---|---|---|---|---|---|---|---|---|---|---|
| | PA | formaldehyde | urea | PA | formaldehyde | urea | | | | | |
| 1 | 0.2 | 15 | 20 | 0.002 | 0.3 | 0.2 | — | 4.25 | 50 | 24 | sticky solid |
| 2 | 0.2 | 15 | 20 | 0.002 | 0.3 | 0.2 | — | 4.3 | room temp | 24 | very thick, yet flowing |
| 3 | 0.2 | 15 | 20 | 0.002 | 0.3 | 0.2 | HCl | 4.3 | 50 | 47 | non-flowing solid |
| 4 | 0.2 | 15 | 20 | 0.002 | 0.3 | 0.2 | NaOH | 8.6 | 50 | 47 | ½ precipitate |
| 5 | 0 | 15 | 20 | 0 | 0.3 | 0.2 | — | 4.0 | 50 | 1.5 | paste-like solid |

TABLE-continued

| Example | concentration of reactants (wt %) | | | moles of reactants | | | pH adjustor | initial pH of reaction | initial reaction temperature (°C.) | total reaction time | product description |
| --- | --- | --- | --- | --- | --- | --- | --- | --- | --- | --- | --- |
| | PA | formaldehyde | urea | PA | formaldehyde | urea | | | | | |
| 6 | 0 | 30 | 40 | 0 | 0.6 | 0.4 | — | 4.25 | 50 | 1.5 | rigid solid |

EXAMPLE 7

100 barrels of urea-formaldehyde-polyacrylamide slug are prepared by combining 50 barrels of 0.5% polyacrylamide with 50 barrels of 37% formaldehyde solution at ambient temperature. 3805 kilograms of solid urea is added to the above solution and dissolved by passing the mixture through a series of in-line mixers. The pH of the resulting solution is maintained at 4.0 with the addition of hydrochloric acid. The entire volume of the slug is immediately injected into a hydrocarbon-bearing formation via a well at a rate of 400 barrels per day. Six hours is required to inject the slug into the formation. The fluid preferentially enters the highly permeable zones of the formation. The formation water has a temperature of 50° C. and a pH of 7. After two days, the injected fluid sets in the highly permeable zones to a non-flowing, water-insoluble polymer resin. The polymer resin substantially prevents migration of fluids into the highly permeable zones.

EXAMPLE 8

The pH of the slug of Example 7 is adjusted to 8.5 with the addition of sodium hydroxide. The slug is immediately injected into a hydrocarbon-bearing formation via a well at a rate of 400 barrels per day. The formation water has a temperature of 50° C. and a pH of 7. After two days the injected fluid precipitates to form a partial plug of the highly permeable zones.

EXAMPLE 9

3805 kilograms of solid urea is dissolved in 50 barrels of water. The pH of the solution is adjusted to 4 with the addition of hydrochloric acid. The entire volume of the urea slug is injected into a hydrocarbon-bearing formation via a well at a rate of 400 barrels per day. Three hours is required to inject the slug into the formation. The formation water has a temperature of 50° C and a pH of 7. 100 barrels of the formaldehyde-polyacrylamide solution of Example 7 with an adjusted pH of 4 is injected into the formation following the urea slug at a rate of 400 barrels per day. The more viscous formaldehyde-polyacrylamide solution fingers through the urea already in place in the highly permeable zones of the formation. The formaldehyde-polyacrylamide solution reacts in contact with the urea to produce polymer resin. After three days the polymer resin sets in the highly permeable zones creating a complete plug.

EXAMPLE 10

100 barrels of urea-formaldehyde-acrylamide polymer slug are prepared by combining 50 barrels of 0.5% acrylamide polymer with 50 barrels of 37% formaldehyde solution at ambient temperature. The acrylamide polymer contains 60% unhydrolyzed acrylamide groups and 40% hydrolyzed acrylamide groups. 3805 kilograms of solid urea is added to the above solution and dissolved by passing the mixture through a series of in-line mixers. The pH of the resulting solution is maintained at 4.0 with the addition of hydrochloric acid. The entire volume of the slug is immediately injected into a hydrocarbon-bearing formation via a well in the same manner and under the same conditions as Example 7. After two days the injected fluid precipitates to form a partial plug of the highly permeable zones.

While the foregoing preferred embodiment of the invention has been described and shown, it is understood that the alternatives and modifications, such as those suggested and others, may be made thereto and fall within the scope of the invention.

What is claimed:

1. A process for selectively plugging highly permeable zones of a subterranean formation comprising the steps of:
    (a) injecting urea, an aldehyde and an acrylamide polymer into the highly permeable zones via a well in fluid communication with said zones, wherein the equivalents of aldehyde groups of said aldehyde exceed the moles of said urea and the moles of said urea exceed the equivalents of unhydrolyzed acrylamide groups of said polymer; and
    (b) reacting said urea, aldehyde and acrylamide polymer in situ at a temperature of from about 20° C. to about 75° C. and at a pH of from about 3 to about 9 for a time of from about 2 to about 72 hours to produce a polymer resin which plugs said highly permeable zones.

2. The process of claim 1 wherein said urea, aldehyde and acrylamide polymer are combined in an aqueous solution at ambient atmospheric temperature prior to injecting into said zones.

3. The process of claim 2 wherein the pH of said solution is adjusted to from about 3 to about 9 by the addition of a pH adjustor prior to injecting said solution.

4. The process of claim 3 wherein the pH of said solution is adjusted to from about 4 to about 8 prior to injecting said solution.

5. The process of claim 1 wherein said urea is sequentially injected into said zones ahead of said aldehyde and acrylamide polymer and allowed to penetrate said zones prior to injecting said aldehyde and polymer.

6. The process of claim 5 wherein said aldehyde and acrylamide polymer are combined and the pH of the resulting aldehyde and acrylamide polymer solution is adjusted from about 4 to about 8 prior to injecting said solution into said zones.

7. The process of claim 1 wherein the ratio of equivalents of said aldehyde groups to moles of said urea is from about 1.2:1 to about 2:1 and the ratio of moles of said urea to equivalents of said unhydrolyzed acrylamide groups is from about 28:1 to about 288:1.

8. The process of claim 7 wherein the ratio of equivalents of said aldehyde groups to moles of said urea is about 1.5:1 and the ratio of moles of said urea to equivalents of said unhydrolyzed acrylamide groups is about 115:1.

9. The process of claim 1 wherein the molecular weight of said acrylamide polymer is from about 100,000 to 10,000,000.

10. The process of claim 9 wherein the molecular weight of said acrylamide polymer is from about 1,000,000 to about 6,000,000.

11. The process of claim 10 wherein said acrylamide polymer is polyacrylamide wherein about 0% to about 40% of the amide groups are hydrolyzed.

12. The process of claim 11 wherein about 100% of the amide groups of said polyacrylamide are hydrolyzed.

13. The process of claim 1 wherein said aldehyde contains up to about 4 carbon atoms.

14. The process of claim 13 wherein said aldehyde is formaldehyde.

15. The process of claim 1 wherein said urea, aldehyde and acrylamide polymer are reacted at a temperature of from about 40° C. to about 60° C.

16. The process of claim 1 wherein said urea, aldehyde and acrylamide polymer are reacted for a time of from about 8 to about 48 hours.

17. The process of claim 1 wherein the pH of water within said formation is adjusted to from about 3 to about 9 by pre-flushing said formation with a pH adjustor prior to injecting said urea, aldehyde and acrylamide polymer.

18. A process for making a polymer resin comprising the steps of:

(a) combining an amount of urea, aldehyde and acrylamide polymer in an aqueous solution sufficient to produce a polymer resin, wherein the equivalents of aldehyde groups of said aldehyde exceed the moles of said urea and the moles of said urea exceed the equivalents of unhydrolyzed acrylamide groups of said polymer;

(b) adjusting the pH of said solution to from about 3 to about 9; and (c) reacting said solution at a temperature of from about 20° C. to about 75° C. for a time of from about 2 to about 72 hours to make said polymer resin.

19. The process of claim 18 wherein said acrylamide polymer is 100% unhydrolyzed polyacrylamide and said aldehyde is formaldehyde; the initial concentration in said solution of said polyacrylamide is from about 0.1% to about 1% by weight, said urea is from about 4% to about 50% by weight and said formaldehyde is from about 4% to about 40% by weight.

20. The process of claim 19 wherein the molecular weight of said polyacrylamide is from about 1,000,000 to about 6,000,000.

21. The process of claim 19 wherein said solution is reacted at a temperature of from about 40° C. to about 60° C.

22. The process of claim 19 wherein the pH of said solution is adjusted to from about 4 to about 8.

23. The process of claim 19 wherein said solution is reacted for a time of from about 8 to about 48 hours.

* * * * *